(12) United States Patent
Rosado

(10) Patent No.: US 6,740,363 B1
(45) Date of Patent: May 25, 2004

(54) METHOD FOR PRODUCING HIGH-TEMPERATURE LUBRICIOUS GLASSY FILMS ON SILICON-BASED CERAMICS

(75) Inventor: Lewis Rosado, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/421,412

(22) Filed: Apr. 17, 2003

(51) Int. Cl.$^7$ .............................. B05D 3/02; B05D 1/36
(52) U.S. Cl. ................... 427/419.1; 427/419.2; 427/376.2; 427/378; 427/380
(58) Field of Search .................. 427/419.1, 419.2, 427/376.2, 378, 380

(56) References Cited

U.S. PATENT DOCUMENTS

| | | | |
|---|---|---|---|
| 3,953,221 A | 4/1976 | Lange | |
| 4,099,979 A | * 7/1978 | Lange et al. | 501/97.1 |
| 5,089,154 A | 2/1992 | King | |
| 5,163,757 A | 11/1992 | Graham | |
| 5,294,355 A | 3/1994 | King et al. | |
| 5,327,998 A | * 7/1994 | Rosado et al. | 184/55.1 |
| 5,507,961 A | * 4/1996 | Forster et al. | 508/167 |

* cited by examiner

Primary Examiner—Michael Barr
(74) Attorney, Agent, or Firm—Charles E. Bricker; Thomas L. Kundert

(57) ABSTRACT

Provided is a method to produce high-temperature lubricious glassy films on silicon-based ceramics. The method comprises the steps of (a) oxidizing a silicon-based component, (b) coating the oxidized component with an alkali metal compound, and (c) heating the component to a high temperature in a sulfur-rich oxidizing environment. The steady state sliding friction coefficient values obtained with this system in 600° C. air are similar to those obtained with liquid lubricants operating under boundary lubrication conditions at much lower temperatures.

7 Claims, 1 Drawing Sheet

METHOD FOR PRODUCING HIGH-TEMPERATURE LUBRICIOUS GLASSY FILMS ON SILICON-BASED CERAMICS

RIGHTS OF THE GOVERNMENT

The invention described herein may be manufactured and used by or for the Government of the United States for all governmental purposes without the payment of any royalty.

BACKGROUND OF THE INVENTION

The present invention relates to a lubrication system enabling ceramic bearings to resist mechanical wear at elevated temperatures.

The upper temperature limit of synthetic oils currently used in aircraft turbine engines is approximately 230° C. In hi-Mach expendable engine applications, such as in future supersonic cruise missiles, mainshaft support bearing temperatures could be as high as 650° C. and consequently, conventional mechanical system technology becomes unacceptable. The bearing temperatures anticipated in these systems are also above the oxidational limit of conventional inorganic solid lubricant formulations such as graphite, molybdenum disulfide, and tungsten disulfide. Though some progress has been made in high-temperature, self-lubricating bearing technology using sodium silicate bonded films containing complex metal chalcogenide solid lubricants on $Si_3N_4$ bearing components (see, for example, U.S. Pat. Nos. 5,507,961; 5,089,154; and 5,294,355), bearing life and performance has been unreliable. Also, the coating spray process used for these silicate bonded films can result in undesirable film thickness variations and the bonded films can be susceptible to coating flaking, delamination, and dehydration. Although excellent control of film thickness, adherence, and coating chemical composition could be obtained with other methods, such as plasma spray, ion beam mixing, chemical vapor deposition, and pulsed laser deposition, these require complex and costly film coating apparatus and some are only applicable to simple geometric part shapes. What is desired is a simple method to produce a thin glassy lubricious film.

Accordingly, it is an object of the present invention to provide a novel method to produce high-temperature lubricious glassy films on silicon-based ceramics.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a method to produce high-temperature lubricious glassy films on silicon-based ceramics. The method comprises the steps of (a) oxidizing a silicon-based component, (b) coating the oxidized component with an alkali metal compound, and (c) heating the component to a high temperature in a sulfur-rich oxidizing environment.

DETAILED DESCRIPTION OF THE INVENTION

Figure 1:
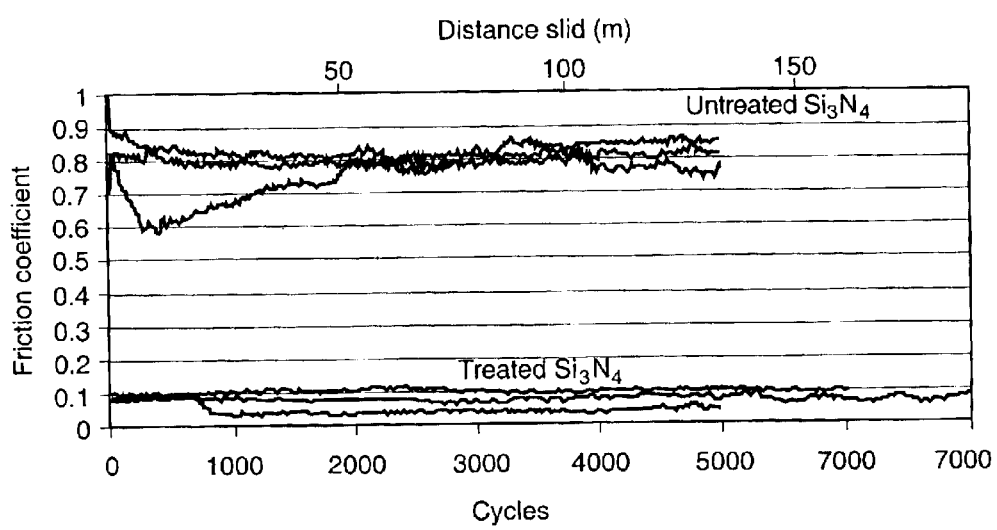
FIG. 1 is a friction trace of treated and untreated $Si_3N_4$ samples.

The silicon-based ceramics employed in the process of this invention can be silicon nitride or silicon carbide. The silicon-based body consists essentially of silicon nitride or silicon carbide, and a sintering aid. Typical sintering aids include magnesium oxide, yttrium oxide and alumina. The sintering aid is generally present in an amount ranging from about 0.1 to 10 weight percent based on the weight of the silicon-based body.

The silicon-based component is first oxidized to form a thin $SiO_2$ surface scale. Such oxidation can be accomplished by heating the component in air at an elevated temperature sufficient to achieve such oxidation for a time sufficient to achieve a desired level of surface scale. In general, heating the component at about 900° C. for three hours is sufficient to achieve the desired result.

The component is then treated with at least one alkali metal compound, typically an aqueous solution of a soluble alkali metal compound. For the purpose of this invention, the term "alkali metal" includes the metals Na, K, Rb and Cs from Group Ia of the Periodic Table of the Elements. In general, immersion of the component in an alkali metal solution, such as a 50 wt. % cesium hydroxide aqueous solution, with heating at 120° C. for about 2 hours is sufficient. The component is then dried.

Finally, the component is annealed at an elevated temperature in a sulfur-rich oxidizing environment. This hot-corrosion process causes metal species from the alkali metal compound and the sintering aid to migrate towards the surface forming a modified $SiO_2$ surface reaction layer. In the case of $Si_3N_4$ sintered with magnesium oxide as the sintering aid and treated with an aqueous solution of CsOH, that layer initially consists of a mixture of lubricious cesium sulfate ($Cs_2SO_4$), cesium silicate ($Cs_2O.xSiO_2$), and magnesium silicate ($MgO.xSiO_2$) species. It is believed that the glassy silicate species begin to dominate the surface film composition as sliding or component operation progresses at high temperature and as volatile sulfur-containing species are lost. Mass diffusion and mild oxidation reactions during component operation enhance the lubricious film endurance.

The method of the present invention provides several advantages over current methods. The method does not require use of a binder or specialized coating equipment and can be applied to geometrically complex parts such as rolling element bearings. No external lubricant supply is required since the lubricious film is formed in-situ through oxidation type reactions between chemical constituents already present within the substrate material, the surrounding air, and the modified surface oxide layer. One of the unique aspects of the invention is that the lubricious film is enhanced by mass diffusion of oxygen from the surrounding environment, surface additives produced during alkali treatment and annealing, and substrate chemical species (for example, Si and MgO processing aid). Therefore, the relatively thin films obtained with this process (90 to 120 nm) are sufficient to allow limited-life endurance under extreme thermal conditions in air. The thin films in turn, allow for a simplified bearing design over designs using thick bonded coatings, and tight internal clearances in rolling element type bearings are maintained during operation.

The following example illustrates the invention:

EXAMPLE

A commercially available hot-isostatically pressed $Si_3N_4$ component sintered with 1.0 wt. % magnesium oxide (MgO) was used as substrate material. The samples were pre-oxidized to form a thin $SiO_2$ surface scale. Pre-oxidation was carried out in air at 900° C. for three hours. The samples were then dipped in a 50 wt. % cesium hydroxide aqueous solution as to achieve complete coverage of the part and heated for two hours at 120° C. The parts were then drained and excess CsOH solution removed by wiping with tissue and allowed to air dry for one hour. A final one hour anneal was conducted at 800° C. using a muffle furnace in a sulfur-rich oxidizing environment.

The steady state sliding friction coefficient obtained with this system in 600° C. air ranged between 0.04 to 0.10. This is shown in FIG. 1, which shows the friction coefficients of treated and untreated samples as a function of cycles and distance slid using a ball-on-disk configuration. Wear factors obtained with this system ranged between $1 \times 10^{-9}$ to $1 \times 10^{-8}$ mm$^3$/N-m. These values are similar to those obtained with liquid lubricants operating under boundary lubrication conditions at much lower temperatures. The wear rates obtained are clearly suitable for limited-life bearing systems. The low-temperature performance of the proposed system could be enhanced if necessary by burnishing the surface of annealed parts with conventional solid lubricants such as graphite, MoS$_2$, or WS$_2$.

Having thus described exemplary embodiments of the present invention, it should be noted by those skilled in the art that the disclosures herein are exemplary only and that alternatives, adaptations and modifications may be made within the scope of the present invention.

I claim:

1. A method to produce high-temperature lubricious glassy films on silicon-based ceramics which comprises the steps of (a) oxidizing a silicon-based component, (b) coating the oxidized component with an alkali metal compound, and (c) heating the component to a high temperature in a sulfur-rich oxidizing environment.

2. The method of claim 1 wherein said silicon-based component consists essentially of silicon nitride or silicon carbide, and a sintering aid.

3. The method of claim 2 wherein said sintering aid is selected from the group consisting of magnesium oxide, yttrium oxide and alumina.

4. The method of claim 2 wherein the amount of said sintering aid ranges from about 0.1 to 10 weight percent based on the weight of the silicon-based component.

5. The method of claim 1 wherein said silicon-based component is heated in step (a) to a temperature of about 900° C. for three hours to form a thin SiO$_2$ surface scale.

6. The method of claim 1 wherein said silicon-based component is treated in step (b) with at least one alkali metal compound selected from the group of Na, K, Rb and Cs compounds.

7. The method of claim 6 wherein said alkali metal compound is an hydroxide.

* * * * *